United States Patent [19]

Stangl

[11] Patent Number: 4,596,042
[45] Date of Patent: Jun. 17, 1986

[54] RADIO TRANSMISSION METHOD FOR A MOBILE RADIO SYSTEM

[75] Inventor: Horst Stangl, Brugg, Switzerland

[73] Assignee: BBC Brown, Boveri & Co., Limited, Baden, Switzerland

[21] Appl. No.: 559,262

[22] Filed: Dec. 8, 1983

[30] Foreign Application Priority Data

Dec. 21, 1982 [EP] European Pat. Off. ........ 82201641.6

[51] Int. Cl.⁴ ............................ H04B 1/00; H04B 7/00
[52] U.S. Cl. ........................................ 455/56; 455/17; 455/33
[58] Field of Search ............. 455/10, 11, 17, 32, 455/33, 49, 52, 54, 56, 58; 179/2 EB; 340/825.44, 825.48

[56] References Cited

U.S. PATENT DOCUMENTS

| | | | |
|---|---|---|---|
| 3,913,017 | 10/1975 | Imaseki | 455/33 |
| 4,092,600 | 5/1978 | Zimmermann et al. | 455/33 |
| 4,392,242 | 7/1983 | Kai | 455/33 |
| 4,409,687 | 10/1983 | Berti et al. | 455/32 |
| 4,481,670 | 11/1984 | Freeburg | 455/33 |

*Primary Examiner*—Jin F. Ng
*Attorney, Agent, or Firm*—Oblon, Fisher, Spivak, McClelland & Maier

[57] ABSTRACT

In a radio transmission method for a mobile radio system, a link between a mobile station and a central station is established via one of several base stations. The selection of the base station is done by the mobile station in accordance with radio-engineering criteria, and only the transmitter of the selected base station is keyed. This makes the method economical with respect to frequencies, on the one hand, and on the other hand, requires little operational effort for the chain of base stations.

8 Claims, 5 Drawing Figures

RADIO TRANSMISSION METHOD FOR A MOBILE RADIO SYSTEM

BACKGROUND OF THE INVENTION

1. Field of the Invention

The invention relates to a radio transmission method for a mobile radio system, wherein a radio link is established between a central station and a mobile station by means of at least two base stations each including a transmitter and a receiver and each exchanging low frequency signals with the central station.

2. Description of the Prior Art

Such a radio transmission method is known, for example, as common-channel radio operation from the printed document German Auslegeschrift No. 1,230,471. In this document, the base station transmitters are operated with carrier frequencies which are located in the same channel and which differ in adjacent base stations by a slight carrier frequency offset and are modulated synchronously with the low-frequency signals coming from the central station. The base stations are here arranged in such a way that their service areas overlap and together cover a predetermined area within the range of which a radio link can be established between the central station and a mobile station.

Although such genuine common-frequency radio communication only requires a single carrier frequency to cover a greater service area, disturbances in the radio link will occur in the boundary zones between adjacent service areas because of interference effects. Such disturbances can be reduced to a tolerable degree only by means of considerable additional synchronization effort with regard to synchronisation by providing phase delay equilization and frequency stability in the base stations. In addition, the simultaneous operation of all base stations leads to an unnecessarily high consumption of energy which can be undesirable in cases in which only a power supply with limited output is available for operational reasons.

SUMMARY OF THE INVENTION

Accordingly, the objects of this invention are to provide a novel radio transmission method which, while involving little carrier-frequency engineering effort, simultaneously avoids the radio engineering difficulties of common-channel radio operation and can be implemented with reduced system and operating costs.

These and other objects are achieved according to the invention by providing a radio transmission method of the type above noted further characterized by the mobile station itself selecting a particular base station, and only the selected base station being keyed upon selection by the mobile station, whereby an efficient radio link is established between the mobile station and the central station. As a result, the special advantage arises that in an existing radio link in each case only the transmitter of one base station is fully operated and uses power, the base stations do not interract with each other in an interfering manner and in all cases a base station is selected which is favorable for the respective site of the mobile station.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
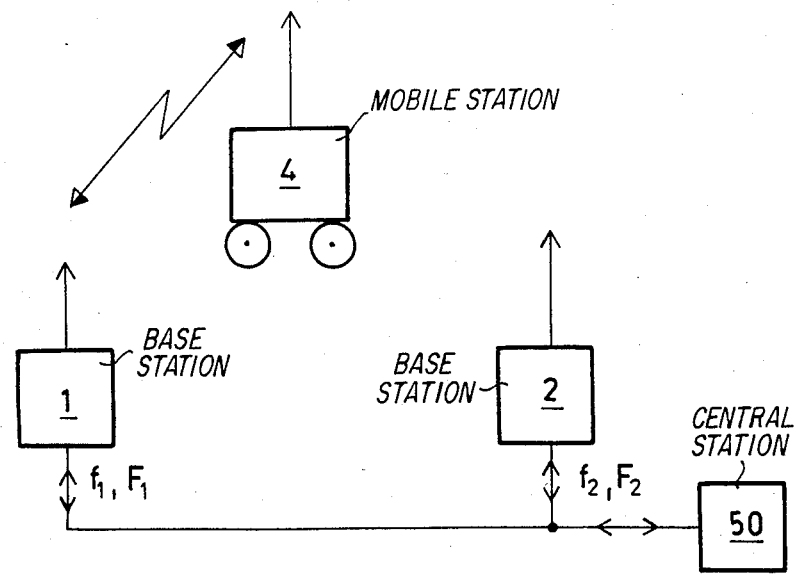
FIG. 1 is a schematic diagram of the basic configuration of a mobile radio system for carrying out the method according to the invention.

Referring now to the drawings, wherein like reference numerals designate identical or corresponding parts throughout the several views, FIG. 1 shows the basic configuration of a mobile radio system such as can be used for carrying out the method according to the invention. It includes at least one mobile station 4 which is constructed as a transceiver and at least two base stations 1 and 2 which also have transmitters and receivers and are jointly connected to a central station 50. Exchange low-frequency signals, for example via a four-wire line plus signalling line (bus channel) or a radio link with the central station 50.

In accordance with their stipulated transmitting power, the two base stations 1 and 2 have certain service areas, that is to say limited areas in which radio communication with the mobile station 4 is possible. The service areas are suitably arranged adjacently in such a manner that the total service area results in a larger coherent service area in which a radio link can be maintained without gaps between mobile station 4 and the central station 50. This is achieved by overlapping adjacent service areas. The interference disturbances, known from common-channel radio, in the overlap regions do not, however, occur in this case because in an existing radio link only the transmitter of the base station selected by mobile station 4 because of its favorable position with respect to the mobile station is keyed.

If the mobile station 4 is located, for example, in the service area of base station 1, the RF signal of the base station will arrive there with a considerably higher field strength than a comparable signal from base station 2. This difference in the arriving field strengths can be utilized for selecting for the respective site of mobile station 4 the more favourable, from a radio engineering point of view, of several base stations. In the overlap region of two base stations in which approximately equal field strengths occur and, therefore, a field strength-related selection criterion is not appropriate, the base station used for the radio link with the central station 50 is that which has first been interrogated by the mobile station 4 during the selection process. Proceeding in this manner is justified by the fact that in the overlap region, both adjacent base stations are equivalent with respect to the quality of the ratio link.

Since the mobile station 4 is mobile in the whole service area composed of the individual service areas, it is of advantage to provide an automatic switch-over function for the radio link from one base station to another when the mobile station 4 changes from one service area to another. This is achieved by controlling the keying of the transmitter of a base station by a signal from the mobile station 4 and, in the case of an interruption of an existing radio link, reselecting a base station.

The transmitter of a base station is always keyed when the base station receives the control signal from the mobile station 4. However, if the mobile station 4 is leaving the service area of the base station whose transmitter is just being keyed as a result of the control signal, the control signal is also no longer being received and the criterion for keying ceases to exist. The transmitter then no longer produces RF power. This results in an indication in the mobile station that the radio link is interrupted after which immediately a new selection process for a base station is initiated.

Selection of the base station is preferably done in a search cycle in which the base stations 1 and 2 are successively called up by the mobile station 4 and the transmitter of a called base station is keyed for the purpose of acknowledging a received call. As long as the mobile station 4 is outside the service area of a base station during the search cycle, this base station cannot receive the call. Its transmitter is not keyed and thus also does not emit an acknowledgement to the calling mobile station. If thus the call to a base station has not been acknowledged after a predetermined period of time, the mobile subscriber or the mobile station 4 knows that a radio link is not possible via this base station. The search cycle is then continued with a call to the next base station.

However, as soon as the call has been received in a base station, the transmitter of this base station is automatically keyed. The RF signal sent out is received by the mobile station 4 and thus the possibility of establishing a radio link via this base station is confirmed. Consequently, the search cycle is stopped and the radio traffic is handled via this last-called base station.

It is true that the selection process described basically guarantees the setting up of a radio link whenever a connection is at all possible. But if the mobile station 4 is located inside the service areas of several base stations, that is to say if several radio links of, in most cases, different transmission quality are possible, in accordance with the methods described, the base station selected from the possible ones is that which is first called within the search cycle. However, so that in the selection process also the incident RF field strength of the received base stations is taken into consideration at the site of the mobile station 4, in a preferred embodiment of the invention first a first search cycle is run with reduced RF sensitivity in the receiver of the mobile station 4. This attenuation then has the result that in the first search cycle the acknowledgements of base stations called but arriving with weaker signal strengths are not received so that only one base station with high incident RF field strength is selected.

However, if the mobile station 4 happens to be located in the overlap region of several service areas during the first search cycle, the RF signals of the corresponding base stations arrive with approximately equal weakness. For this reason, at first generally none of these base stations is selected. In this case, the first search cycle is concluded without selection. After the first one, a further search cycle is then initiated with the mobile station 4 being set to full RF sensitivity which then leads to the selection of a base station arriving with weaker signal strength. However, if also in this further search cycle the call is not acknowledged by any base station because, for example, the mobile station 4 is located outside the service area or the radio system is occupied by another mobile station, the selection process is discontinued and the mobile subscriber is provided with an indication that at present no radio link with the central station 50 is possible.

It is of particular advantage for the selection process to allocate to each of the base stations 1 and 2 a corresponding low-frequency call signal $f_1$ and $f_2$. These call signals $f_1$ and $f_2$ can be, for example, tone signals with different frequencies which for the purpose of calling a base station are sent out individually, modulated onto a RF carrier, by the mobile station 4. Such a call signal is then received by the associated base station and detected by means of a detector. As soon as a base station has detected the call signal allocated to it, the transmitter of this base station is keyed in order to acknowledge the receipt of the call signal and thus to break off the search cycle which is running in the mobile station 4. Naturally, other call signals, for example those which are differentiated by means of a digital type of coding, can be used.

Figure 2:
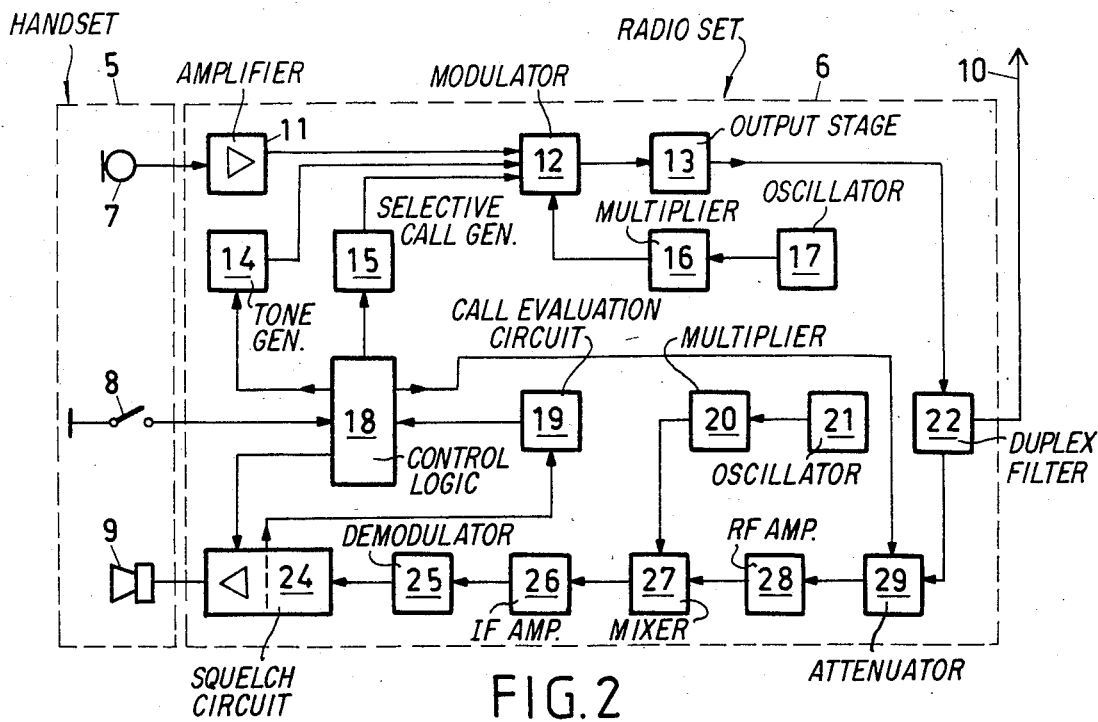
FIG. 2 is a block diagram of a mobile station according to FIG. 1.
Figure 3:
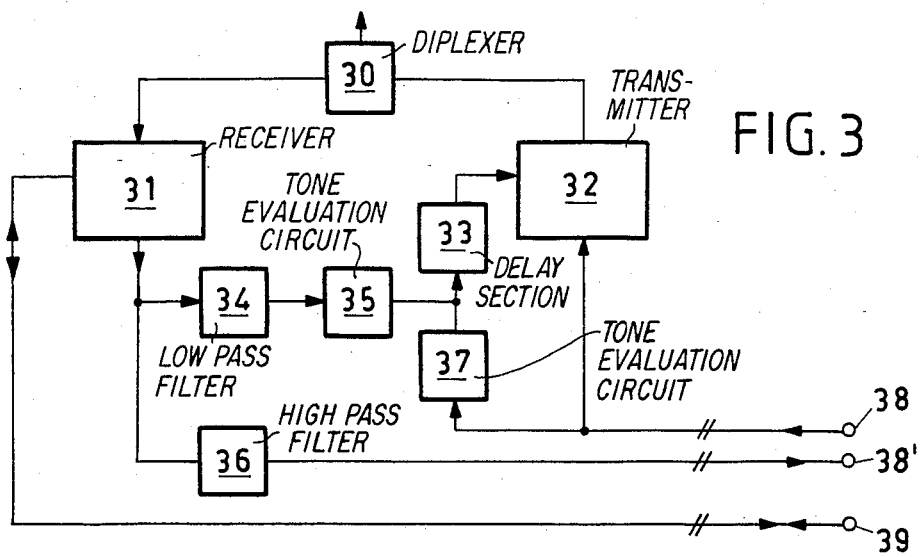
FIG. 3 is a block diagram of a base station according to FIG. 1.
Figure 4:
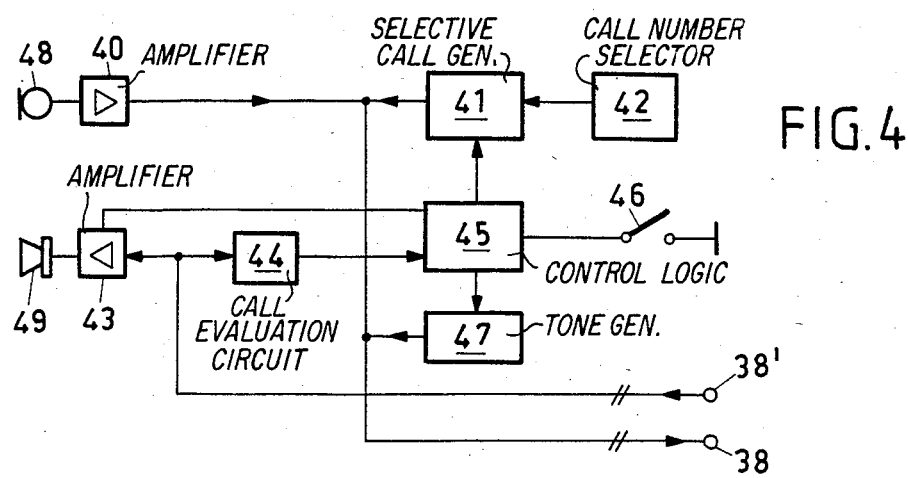
FIG. 4 is a block diagram of a central station according to FIG. 1.

The block diagrams of suitable equipment configurations, such as can be used for carrying out the radio transmission method described, are shown in FIGS. 2, 3 and 4. FIG. 2 shows the block diagram of a mobile station. This is divided into a handset 5 containing a microphone 7, a loudspeaker 9 and a cradle contact 8, and a radio set 6 which is formed of the essential electric assemblies and can be broken down into a transmit section, a receive section, and a control section. It is further possible to complement the unit, for example by providing it with data sources and data sinks which are not, however, indicated in FIG. 2.

The transmit section includes a modulator 12 the output of which drives a transmitter output stage 13 which, in turn, is connected to an antenna 10 via a Duplex filter network 22 suitable for Duplex operation. The modulator 12 has an input for the carrier frequency which is generated by a transmitter oscillator 17 which is followed in the circuit by a first multiplier 16, and further inputs for a speech signal, a call signal and a selective calling signal. The speech signal is generated in the microphone 7 and applied via an amplifier 11 to the appropriate input of the modulator 12. The call signal originates from a tone generator 14 and the selective calling signal from a comparable selective call generator 15.

The receive section includes of an RF preamplifier 28 into which the antenna voltage is fed via the Duplex filter network 22 and a variable attenuator 29, a mixer stage 27, an IF amplifier 26 and a demodulator 25. In the mixer stage 27, the modulated carrier frequency from the RF preamplifier 28 is mixed in the conventional manner with a local-oscillator frequency from a receiver oscillator 21 by means of a subsequent second multiplier 20. The demodulated LF signal is fed by the demodulator 25 via a squelch circuit 24, which is combined with an amplifier, to the loudspeaker 9 of the handset 5. The control section includes a central control logic 18 which, on the one hand, receives control commands from the cradle contact 8 and a selective call evaluation circuit 19 and, on the other hand, issues control commands to the tone generator 14, the selective call generator 15, the variable attenuator 29 and the squelch circuit 24. The control logic 18 controls the automatic establishing of the radio link, its maintenance and its disconnection. Lifting off the handset 5, that is to say the closing of the cradle contact 8, or the recognition of a selective call by the central station 50 by the selective call evaluation circuit 19, have the effect that the transmitter of the mobile station 4 is keyed and the tone generator 14 is given the command, by the control logic 18, to modulate the transmitter with a first frequency $f_1$. Simultaneously, the control logic 18 sets the variable attenuator 29 to a high attenuation which can be, for example, 26 dB.

Transmission of the call signal $f_1$ starts the first search cycle for selecting a base station in a radio-technically favorable location. If this call is not acknowledged by the associated base station 1 by the transmitter of the base station 1 being keyed, in each case after certain waiting periods successively further base stations are called with their associated frequencies or call signals, respectively. If this search cycle is completed without an acknowledgement having occurred, the attenuation at the variable attenuator 29 is reduced by the control logic 18, that is to say, for example, set to 0 dB. Then a further search cycle begins, again with the call signal $f_1$. If this further search cycle is also completed without acknowledgement from a base station, the mobile subscriber is informed in the mobile station 4 by means of an optical or acoustical signal that no link has been established with the central station 50.

However, as soon as the RF signal of a base station is received as acknowledgement during a search cycle, the frequency switching controlled by the control logic is stopped so that during the whole period in which the mobile station 4 is located in the service area of the same base station, the last-generated tone frequency is transmitted with the conversation. If this happens already in the first search cycle the attenuation in the variable attenuator 29 is reduced to 0 dB already at this point in time. If together with the frequency switching also the search cycle has been stopped, the squelch circuit 24 receives the command from the control logic 18 to cancel the silencing of the loudspeaker 9 existing when a search cycle is proceeding, and thus to enable the LF section of the receiver for a subsequent conversation.

From the demodulated LF signal of the demodulator 25 the selective call evaluation circuit 19 detects a selective call which is transmitted by the central station 50 and is used as a call signal for a selected mobile station 4. If such a selective call is received, the control logic 18 initiates the first search cycle for selecting a suitable base station just as when the cradle contact 8 is closed. In addition, in this case the selective call generator 15 receives the command to input a selective call into the modulator 12 as an acknowledgement. This selective call of the mobile station 4 is received and evaluated in the central station 50. This informs the central station that the mobile subscriber has been reached. When in an existing radio link the conversation is to be terminated first from the central station 50, a clearing call is transmitted from there. This clearing call is again recognized by the selective call evaluation circuit 19 which has the effect that the transmitter in the mobile station 4 is switched off and the control logic 18 is reset to its initial state. The mobile subscriber first terminates the conversation by the fact that when the handset 5 is replaced, the cradle contact 8 is opened again.

In FIG. 3 the basic configuration of a base station suitable for the radio transmission method according to the invention is shown in the form of a block diagram. Essentially, the base station is formed a transmitter 32, a receiver 31 and a diplexer 30 via which the transmitter 32 and the receiver 31 are connected to one antenna (not shown). The receiver 31 is also connected via a high-pass filter 36 and an outgoing, normally two-conductor LF line 38' to the central station 50. A LF line 38 coming from the central station leads, on the one hand, directly and, on the other hand, indirectly via a first tone evaluation circuit 37 and a subsequent delay section 33 to the transmitter 32. The receiver is also connected via a low-pass filter 34, a second tone evaluation circuit 35 and the delay section 33 to the transmitter 32.

At the output of the receiver 31 the demodulated LF signal which has been transmitted from the mobile station 4 appears. Apart from the audio signal, it also contains the call signal which is allocated to the base station and which is transmitted in parallel with the conversation. As call signals $f_1$ and $f_2$, advantageously low-frequency signals are used, the frequencies of which are outside the frequency band used for the speech signals. The call signal frequencies can be, for example, 190, 210 or 230 Hz. The cut-off frequencies of the low-pass filter 34 and the high-pass filter 36 are selected and matched in such a manner that the audio signal and the call signal can be separated from each other. The higher-frequency audio signal passes the high-pass filter 36 without significant attenuation and is passed on to the central station 50 via the LF line 38'. The low-pass filter 34 blocks the audio signal but passes the call signals $f_1$ and $f_2$ to the second tone evaluation circuit 35 which is tuned and responds to the call signal allocated to the base station. The tone evaluation circuit 35 controls the keying of the transmitter 32. The delay section 33 with its preset delay time has the effect that the transmitter 32 remains switched on for a certain time when the criterion for keying disappears.

However, it is also possible to activate the transmitter 32 of a base station from the central station 50 by sending a control signal with the frequency $F_1$ or $F_2$ via the LF line 38 before transmitting information. This control signal evokes the response of the first tone evaluation circuit 37 of the associated base station, which circuit keys the transmitter 32 via the delay section 33. Because of the frequency response of the bus channel, the frequency of the control signal $F_1$ or $F_2$ is advantageously located in the range between 300 Hz and 3,300 Hz. As in the case of the call signals, each base station is also associated with its own dedicated control signal. Also, differentiation of these control signals can be done by suitable coding instead of by means of frequency allocation.

FIG. 4 is a block diagram of the basic configuration of a suitable central station. From a microphone 48, the speech signals go via a first amplifier 40 to the LF line 38 to the base stations 1 and 2. Via the same LF line, the selective call from a selective call generator 41 for selecting a certain mobile station and the control signal $F_1$ and $F_2$ from a tone generator 47 or an appropriate coding device are also transmitted. The type of the selective call generated in the selective call generator 41 is determined by a call number selector 42 at which the call number of a mobile station with which a radio link is to be established is set. The LF signals arriving on the LF line 38' which contain either a selective call as acknowledgement from a mobile station or pure speech or data signals, are either processed by a selective call evaluation circuit 44 or fed via a second amplifier 43 to a loudspeaker 49. Alternatively, a data sink can also be considered. The functional process in the central station 50 during the radio link is determined by a control logic 45, similar to that in the mobile station of FIG. 2. Control logic 45 receives signals from the signal evaluation circuit 44 and a call key 46 and, in turn, feeds commands to the selective call generator, 31, the second amplifier 43 and the tone generator 47.

By pressing the call key 46, the tone generator 47 is switched on via the control logic 45. The control signal $F_1$ or $F_2$ generated in the tone generator is sent to all base stations via the LF line 38. The tone evaluation circuit 37 of the base station associated with this control signal responds and keys the transmitter 32. After a short detection and keying-on time of the transmitter, a selective call is generated in the selective call generator 41 of the central station 50 and fed via the LF line 38 directly to the transmitter 32 of the keyed base station and transmitted. That the keying takes place in the time required for this is guaranteed by the delay section 33. When a mobile station receives its selective call, it replies with an acknowledgement. The selective call evaluation circuit 44 in the central station detects the acknowledgement and stops the calling process. However, if the attempt was unsuccessful, that is to say if the mobile subscriber has not been reached, the calling process is repeated with a different control tone, that is to say via another base station. If after a predetermined number of attempts the mobile subscriber is not reached, the central station 50 provides the information that the required subscriber cannot be reached.

Figure 5:
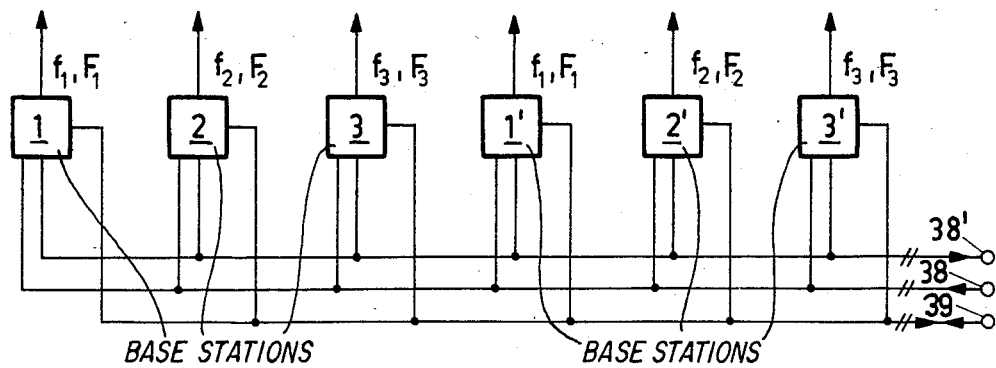
FIG. 5 is a block diagram illustrating the arrangement and signal distribution in the case of several base stations in a larger service area.

In FIG. 5, the arrangement and interconnection of several base stations 1, 2, 3 and 1', 2', 3' which are connected to the central station 50 via the LF lines 38 and 38' is shown. Such an arrangement of the base stations is suitable for securing, for example, the radio coverage in an area along a railway line or road. As described, the base station 1 is associated with the call signal $f_1$ and the control signal $F_1$. A corresponding association exists between the base stations 2 and 3 and the signal pairs $f_2$, $F_2$ and $f_3$, $F_3$. Since as a result of the limited service area of a base station the risk of a multiple radio link being established is low, the next following base station 1' can already be programmed again with the signal pair $f_1$, $F_1$. This correspondingly applies to the stations 2' and 3'.

In such a mobile radio system, the establishment of the connection between the mobile station 4 and the central station 50, neither of which is shown in FIG. 5, is again initiated by lifting off the handset 5 in the mobile station. This causes the transmitter of the mobile station to be keyed and first to be modulated with the call signal $f_1$. If the mobile station is now located in the receiving area of the base stations 1 and 1', the tone evaluation circuit 35 in this base station responds and keys the transmitter 32. However, the acknowledging RF signal of the transmitter 32 can be received by the mobile station 4 only if the field strength at the receiving site is relatively high since the signal is attenuated in the receiver. If, therefore, the received field strength is too low, further attempts are made with the call signal $f_2$ or $f_3$, respectively. This method makes it possible that with a successful attempt the radio link is established via a base station which is optimum with respect to propagation conditions. However, if all three attempts with the call signals $f_1$, $f_2$ and $f_3$ have been negative, the sensitivity of the mobile station 4 is increased or its attenuation reduced, respectively. This guarantees the establishment of a connection even in areas which are critical with respect to propagation.

The reduction in attenuation also takes place if a connection has already been set up in the first search cycle, so that the range is not unnecessarily reduced during operation. If now the connection between the mobile station 4 and a base station is established, the mobile station transmits a selective call which triggers a call tone in the central station 50 and with this indicates that the associated mobile station wishes to conduct a conversation.

Establishing a connection in the reverse direction, that is to say from the central station 50 to the mobile station 4, is initiated by pressing the call key 46 in the central station. In known manner, the control logic 45 causes the tone generator 47 initially to generate the control signal $F_1$. By means of this control signal $F_1$, the transmitters 32 of the associated base stations 1 and 1' are keyed. Within the delay time of the delay sections 33 the selective call of the mobile subscriber to be called is transmitted. If the called mobile station does not acknowledge the call after a certain time, further attempts are carried out via the stations 2, 2' and 3, 3' with the control signals $F_2$ and $F_3$ but with the same selective call. If this is also unsuccessful, the cycle is repeated for a certain number of times since it can be possible that the mobile station was located for a short period in an area which is unfavourable with respect to propagation. However, if the mobile station detects its selective call, it in turn commences the first search cycle for selecting the most favourable base station.

As can be seen from the above description the selection of the favorable base station is carried out in each case by the mobile station 4. Once this has been done, the receivers 31 of all other base stations are locked out. The criteria and commands needed for this are transmitted between the base stations via a common signalling line 39. This achieves that, if the radio system is occupied with an existing link, another mobile subscriber is not given the possibility of establishing a link which would lead to interference in an existing conversation. However, if this other subscriber happens to be located in the service area of the base station carrying the existing link, it could still cause interference since the receiver 31 of this base station is not locked out. This is prevented by blocking the transmit keying in the other mobile station by the received RF signal. Both measures have the result that an attempt at establishing a link with a base station when another link has already been formed with that base station will be unsuccessful. This is indicated to the subscriber by an engaged signal.

If the mobile station 4 now leaves the service area of the selected base station in the course of conversation with the central station 50, the base station can no longer receive its call signal $f_1$, $f_2$ or $f_3$ which has the effect that the keying of the transmitter 32 drops out and simultaneously all receivers 31 are released. Since the mobile station 4 no longer receives a RF signal, a first search cycle is started for the renewed selection of a favorable base station as in the case of establishing the link. The outage in the radio link connected with this is very short and does not cause any interference to the conduct of the conversation so that in the whole service area a high transmission quality radio link between the central station 50 and the mobile station 4 is always possible.

Recapitulating, the method herein described is directed to a radio transmission method offering special economy in frequencies, for radio coverage of large-area regions with a relatively small number of radio subscribers. In this case, it is immaterial if it is a star or a line network. Naturally, it is also possible to use the method with multi-channel systems if this should be required as a result of the number of mobile subscribers. A further advantage lies in the fact that in all cases only one transmitter or one base station, respectively, is keyed during the conduct of the conversation. This does not cause any unnecessary radiation of RF power and reduces the energy requirement. This advantage is of particular relevance in cases where the base stations are operated with wind or solar energy.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A radio transmission method for a mobile radio system, wherein for the purpose of establishing a radio link between a central station and a mobile station at least two base stations defining at least adjacent service areas are provided, said base stations each including a transmitter and a receiver and exchanging low-frequency signals with the central station, comprising:
    said mobile station itself selecting at least one of said base stations for establishing a radio link between said mobile station and the central station; and
    keying the transmitter of only the selected base station for maintenance of said radio link with said mobile station;
    wherein said step of said mobile station itself selecting at least one of said base stations comprises:
    said mobile station initiating a search cycle in which said base stations are successively called by the mobile station, the transmitter of a base station receiving a call from said mobile station being keyed for the purpose of sending a R.F. acknowledgement signal acknowledging a received call from said mobile station, said mobile station receiving said R.F. acknowledgement signal and stopping said search cycle upon receiving said R.F. acknowledgement signal, said mobile station commencing radio traffic with the base station from which said R.F. acknowledgement signal is received;
    said mobile station first initiating said search cycle with reduced R.F. sensitivity; and
    said mobile station continuing said search cycle in the event that no R.F. acknowledgement signal is received during operation with said reduced R.F. sensitivity by varying the sensitivity of the mobile station to a greater R.F. sensitivity if the mobile station has not received an R.F. acknowledgement signal from a base station during operation in the search cycle at reduced R.F. sensitivity.

2. A method according to claim 1, comprising:
    controlling the keying of the transmitter by a signal from the mobile station; and
    said mobile station again selecting a base station in the event of an interruption of the radio link between the mobile station and the selected base station.

3. A method according to claim 2, comprising:
    said mobile station automatically selecting a new base station in the event that said mobile station leaves the service area of a base station with which the mobile station was in communication by means of said radio link.

4. A method according to claim 1, comprising:
    assigning to each base station a respective low-frequency call signal;
    the mobile station in the search cycle transmitting sequentially said call signals of the respective base stations; and
    keying the transmitter of the base station which first detects the reception of a respective call signal.

5. A radio transmission method for a mobile radio system, wherein for the purpose of establishing a radio link between a central station and a mobile station at least two base stations defining at least adjacent sevice areas are provided, said base stations each including a transmitter and a receiver and exchanging low-frequency signals with the central station, comprising:
    said mobile station itself selecting at least one of said base stations for establishing a radio link between said mobile station and the central station; and
    keying the transmitter of only the selected base station for maintenance of said radio link with said mobile station;
    wherein for the purpose of establishing a radio link from the central station to the mobile station, a selective call is transmitted from the central station via a base station selected by the central station to the mobile station and the mobile station on receiving said selective call acknowledges the receipt thereof and initiates the selection of a base station to maintain said radio link.

6. A method according to claim 5, wherein for the purpose of transmitting the selective call in the search cycle, the base stations are successively called by the central station, the selective call is transmitted by respective base station called by the central station to the mobile station, and the central station repeats the successive calling of the base stations until the mobile station acknowledges the receipt of the selective call or until a preset number of successive calls to said base stations has been made by said central station.

7. A method according to claim 6, comprising:
    assigning each base station a control signal; and
    said central station calling said base stations by means of the respective control signals associated therewith.

8. A radio transmission method for a mobile radio system, wherein for the purpose of establishing a radio link between a central station and a mobile station at least two base stations defining at least adjacent service areas are provided, said base stations each including a transmitter and a receiver and exchanging low-frequency signals with the central station, comprising:
    said mobile station itself selecting at least one of said base stations for establishing a radio link between said mobile station and the central station; and
    keying the transmitter of only the selected base station for maintenance of said radio link with said mobile station;
    wherein after a radio link has been established between the mobile station and the central station via a selected base station, the method further comprises:
    locking out the remaining base stations; and
    said mobile station transmitting a selective call to the central station to be used by said central station as an acknowledgement signal indicating establishment of said radio link.

* * * * *